US009661683B2

(12) United States Patent
Horneman et al.

(10) Patent No.: US 9,661,683 B2
(45) Date of Patent: May 23, 2017

(54) USE OF OFF PERIOD OF DRX FOR DIRECT PEER TO PEER COMMUNICATION IN A CELL (75) Inventors: Kari Veikko Horneman, Oulu (FI); Vinh Van Phan, Oulu (FI); Ling Yu, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 738 days.

(21) Appl. No.: 13/062,230

(22) PCT Filed: Sep. 5, 2008

(86) PCT No.: PCT/EP2008/061817
§ 371 (c)(1),
(2), (4) Date: May 23, 2011

(87) PCT Pub. No.: WO2010/025774
PCT Pub. Date: Mar. 11, 2010

(65) Prior Publication Data
US 2011/0237231 A1    Sep. 29, 2011

(51) Int. Cl.
*H04W 76/04* (2009.01)
*H04W 52/02* (2009.01)
*H04W 72/04* (2009.01)
*H04W 72/12* (2009.01)

(52) U.S. Cl.
CPC ..... *H04W 76/048* (2013.01); *H04W 52/0216* (2013.01); *H04W 72/04* (2013.01); *H04W 72/12* (2013.01); *Y02B 60/50* (2013.01)

(58) Field of Classification Search
None
See application file for complete search history.

(56) References Cited

U.S. PATENT DOCUMENTS

| 2005/0239451 | A1* | 10/2005 | Periyalwar et al. ......... 455/425 |
| 2008/0085680 | A1* | 4/2008 | Kim ................... H04W 76/048 455/69 |
| 2008/0181127 | A1 | 7/2008 | Terry et al. ................ 370/252 |
| 2008/0310355 | A1* | 12/2008 | Cai et al. ..................... 370/329 |
| 2010/0113023 | A1* | 5/2010 | Huang et al. ................ 455/436 |

FOREIGN PATENT DOCUMENTS

| CN | 1527622 A | 9/2004 |
| CN | 1565141 A | 1/2005 |
| WO | WO 2008/069950 A2 | 6/2008 |

OTHER PUBLICATIONS

Ericsson, "DRX and DTX in LTE_Active", TSG-RAN WG2 Meeting #52, Mar. 27-31, 2006, (5 pages).
3GPP TS 36.321 V1.0.0 (Sep. 2007), "3$^{rd}$ Generation Partnership Project; Technical Specification Group Radio Access Network; Evolved Universal Terrestrial Radio Access (E-UTRA) Medium Access Control (MAC) protocol specification (Release 8)", 18 pgs.

* cited by examiner

*Primary Examiner* — Gregory Sefcheck
*Assistant Examiner* — Jenkey Van
(74) *Attorney, Agent, or Firm* — Harrington & Smith (57) ABSTRACT

A method and a device for data processing in a cellular network are provided including the step of scheduling data transmission between mobile terminals utilizing a DRX mode of the mobile terminals. Furthermore, a communication system is suggested including said device.

16 Claims, 5 Drawing Sheets

| Parameter Name | Function | | Range | Unit | Scope | Note |
|---|---|---|---|---|---|---|
| On Duration Timer | DRX | MD if DRX configured | 1...? | DL subframe(s) | RRC-DCCH | Specifies the number of consecutive TTIs (of 1ms) during which the UE shall monitor the PDCCH for possible allocations. The On Duration Timer is a part of a DRX Cycle. Exemplary range of {1, 2, 3, 4, 5, 6, 8, 10, 20, 30, 40, 50, 60, 80, 100, 200} ⇒ 4 bits. |
| Long DRX Cycle | DRX | MD if DRX configured | ? | ? | RRC-DCCH | This parameter describes the duration of the long DRX cycle, if configured. This parameter is a multiple of the Short DRX Cycle. Exemplary range of {10, 20, 30, 40, 50, 60, 80, 100, 200, 300, 400, 500, 600, 800, 1000, 2000} ⇒ 4 bits. |
| Short DRX Cycle | DRX | OP | ? | TTI (subframe) | RRC-DCCH | This parameter describes the duration of the short DRX cycle, if configured; Exemplary range of {10, 20, 30, 40, 50, 60, 80, 100, 200, 300, 400, 500} ⇒ 4 bits. |
| DRX Short Cycle timer | DRX | OP | ? | ? | RRC-DCCH | This parameter specifies the number of consecutive TTIs the UE shall follow the short DRX cycle after the DRX Inactivity Timer has expired. Exemplary range of {10, 20, 30, 40, 50, 60, 80, 100, 200, 300, 400, 500} ⇒ 4 bits. |
| DRX Retransmission Timer | DRX | MD if DRX configured | ? | DL subframe(s) | RRC-DCCH | Specifies the maximum number of consecutive TTIs the UE shall monitor the PDCCH for as soon as a DL retransmission is expected by the UE. Exemplary range of {2, 4, 6, 8} ⇒ 2 bits |
| DRX Inactivity Timer | DRX | MD if DRX configured | ? | DL subframe(s) | RRC-DCCH | Specifies the number of consecutive TTIs during which the UE shall monitor the PDCCH after successfully decoding a PDCCH indicating an initial UL or DL user data transmission for this UE. Exemplary range of {1, 2, 3, 4, 5, 6, 8, 10, 20, 30, 40, 50, 60, 80, 100ms} ⇒ 4 bits. |

USE OF OFF PERIOD OF DRX FOR DIRECT PEER TO PEER COMMUNICATION IN A CELL

The invention relates to a method and to a device for data processing in a cellular network and to a communication system comprising such a device.

Trends in mobile radio business and technology are in particular directed to

- Flexible Spectrum Use (FSU) technologies;
- Flexible Dynamic Spectrum Access (FDSA) and Cognitive Radio (CR) approaches;
- reconfigurable radio solutions;
- relaying and collaborative multiple-input-multiple-output (MIMO) that offer promising mobile approaches enhancing coverage and capacity;
- mesh topologies, ad-hoc networking and peer-to-peer communications to be part of the future wireless systems.

Such trends together with a rapid development of mobile internet services and applications are expected to provide cheap, flexible and efficient high-data-rate mobile internet connectivity and multimedia services in forthcoming radio access network systems. This may in particular be facilitated in combination with smart user equipments (UEs) combining reliable mobile cellular access capabilities with CR personal assistant devices and multimode operations over cellular network systems.

Trends towards future wireless networking imply rather heterogeneous environments having radio and network resources shared all over the place according to the needs of, e.g., users, channel and traffic conditions.

The problem to be solved is in particular to obtain and thus to utilize a proper knowledge about a wireless networking environment in an efficient and robust manner especially in order to provide device-to-device communication of mobile terminals.

This problem is solved according to the features of the independent claims. Further embodiments result from the depending claims.

In order to overcome this problem, a method for data processing in a cellular network is provided comprising the step of:

scheduling data transmission between mobile terminals utilizing a DRX mode of the mobile terminals.

The mobile terminal referred to may be or be associated with any device or equipment providing an interface to said cellular network. The mobile terminal may be a computer, a laptop, a personal digital assistant (PDA) or the like comprising such an interface to the cellular network. The mobile terminal may also be any user terminal or user equipment The approach presented is in particular directed to advanced mobile communication networks comprising and in particular utilizing existing and upcoming 3GPP Long Term Evolution (LTE) technologies, e.g., Release 9 and beyond. Basically, the approach presented may apply to or be applicable for future ITU International Mobile Telecommunications Advanced (IMT-A) systems. Such systems may support CR opportunistic device-to-device (D2D) communications between UEs for either relaying purposes towards (central) base stations or NodeBs (NBs) or for any kind of end-to-end (E2E) communication purposes.

Hence, this approach in particular allows to become aware of an adjacent wireless network (or several such wireless networks) and, e.g., to decide in an either centralized or distributed manner as how to explore and utilize the pool of (distributed) mobile resources. It in particular helps to optimize an amount of control signaling involved.

In an embodiment, the mobile terminals are paired device-to-device-capable mobile terminals.

For example, device-to-device-capable mobile terminals may be enabled to at least partially exchange information, e.g., user data, signaling information, etc., with one another in a rather direct manner or via a relaying communication node.

In another embodiment, configuration and/or signaling procedures are provided between each mobile terminal and a base station.

Said base station may be a central base station of a cellular network, a NodeB (NB) or a home base station (home NB).

In a further embodiment, a base station schedules data transmissions between a source UE and a given UE during an OFF duration of a DRX cycle of both UEs.

Said source UE basically refers to any first mobile terminal and said given UE basically refers to any second mobile terminal. The mobile terminals are referred to as use equipments herein.

The DRX cycle comprises an "OFF duration" and an "ON duration". Said OFF duration may be utilized for device-to-device-communication purposes.

In a next embodiment, scheduling is either a semi-static scheduling via persistent allocation and configuration provided by the base station or a dynamic scheduling.

A scheduling indication per DRX cycle can be provided by means of explicit or implicit signaling.

It is also an embodiment that in case of semi-static scheduling the base station reconfigures DRX parameters for the source UE and for the given UE to couple their ON-OFF patterns of the DRX cycle in particular when pairing a given device-to-device-capable UE with a suitable source UE.

Pursuant to another embodiment, the source UE and the given UE are assigned with resources for at least one time interval of coupled OFF duration per DRX cycle for device-to-device communication purposes.

According to an embodiment, a Td2d parameter specifies a semi-static duration of the time interval of a starting subframe within the DRX cycle.

According to another embodiment, the base station informs the source UE and the given UE to enter said OFF duration of the DRX cycle in order to start device-to-device data transmission.

In yet another embodiment, the base station conveys a duration for a subsequent device-to-device scheduling interval and/or a starting time for the scheduling interval and/or an uplink scheduling information to the source UE and to the given UE.

According to a next embodiment, the given UE is configured to monitor a PDCCH for a predetermined time period (also referred to as a Tcch time period).

Pursuant to yet an embodiment, the source UE and the given UE are configured to provide a predetermined time offset at the beginning of a scheduled device-to-device time interval.

This time offset may be utilized for checking, e.g., whether handshaking between involved UEs can be carried out and whether actual device-to-device data transmission is required.

According to an embodiment, the source UE and/or the given UE enter a power-saving mode if no actual device-to-device data transmission is needed.

In a further embodiment, the base station schedules data transmission between the source UE and the base station during an ON duration of the DRX cycle of the source UE.

According to yet a further embodiment, the base station provides scheduling indication to both the source UE and the given UE during said ON duration of the DRX cycle.

The problem stated above is also solved by a device comprising a and/or being associated with a processor unit and/or a hard-wired circuit and/or a logic device that is arranged such that the method as described herein is executable on said processor unit.

According to an embodiment, the device is a communication device, in particular a or being associated with a base station or a mobile terminal.

The problem stated supra is further solved by a communication system comprising the device as described herein.

Embodiments of the invention are shown and illustrated in the following figures:

FIG. 3 shows a table comprising values for an exemplary setting of DRX parameters utilizing E-UTRAN;

Figure 1:
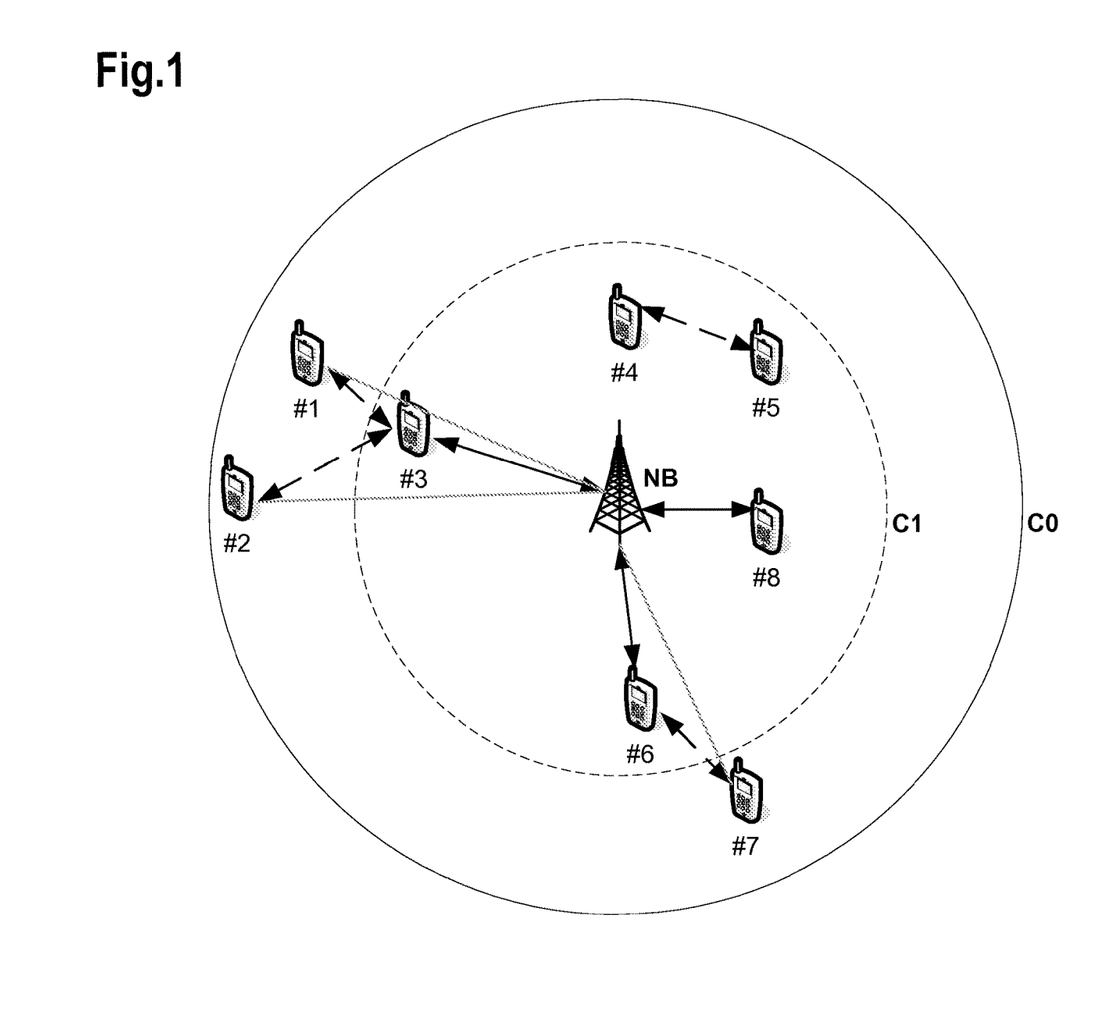
FIG. 1 shows a general system comprising a base station NB surrounded by several mobile terminals.

FIG. 1 illustrates a general system comprising a base station NB surrounded by several mobile terminals UE#1 to UE#8. For example, radio access coverage with mobility support may be provided by an advanced cellular system, such as or based upon 3GPP LTE E-UTRAN. This system can be enhanced to support and at the same time utilize D2D communication capabilities of CR-capable UEs for efficient and cost effective content delivery, network operation and performance. In FIG. 1, mobile terminal UE#3 is relaying packets of mobile terminal UE#1 and mobile terminal UE#2 to/from base station NB. As a further example shown in FIG. 1, mobile terminal UE#4 and mobile terminal UE#5 are communicating directly with one another (i.e. sharing files and/or exchanging information).

The approach presented in particular considers scenarios as depicted in FIG. 1, comprising Cognitive Radio (CR) devices and device-to-device (D2D) communication to provide advanced extensions to cellular access system.

Hence, a CR D2D communications mode of a UE, referred to as a "D2D Mode", may be embedded into RRC_IDLE and RRC_CONNECTED states of the UE camping in a cell of a cellular system of interest. The operation and application of this D2D Mode can be controlled by the radio network controller (RNC) of the cellular system, e.g., by the central NB, using radio-interface control mechanisms such as RRC_IDLE or RRC_CONNECTED procedures or such as L1 signaling.

This is different from any manual operation of D2D communication using a particular radio access technology (RAT) in a predefined spectrum, such as Bluetooth in an ISM band.

The solution suggested herein in particular coordinates and schedules data transmissions of paired D2D-capable UEs, namely a given UE and a source UE, combined with a discontinuous reception and transmission (DRX) mode of active UEs in cellular systems.

The given UE may be a mobile terminal that is handed off to the source UE using an embedded D2D Mode. As an alternative, the source UE may provide mediating or relaying services for the given UE while both UEs remain in an RRC_CONNECTED state.

In advanced cellular systems such as 3GPP LTE E-UTRAN, said DRX mode of active UEs (being in said RRC_CONNECTED state) can be specified and used to ensure, e.g., efficient power saving and timely handover measurement possibilities for the UEs. This DRX operation is based upon a specification provided by 3GPP TS 36.321.

Figure 2:
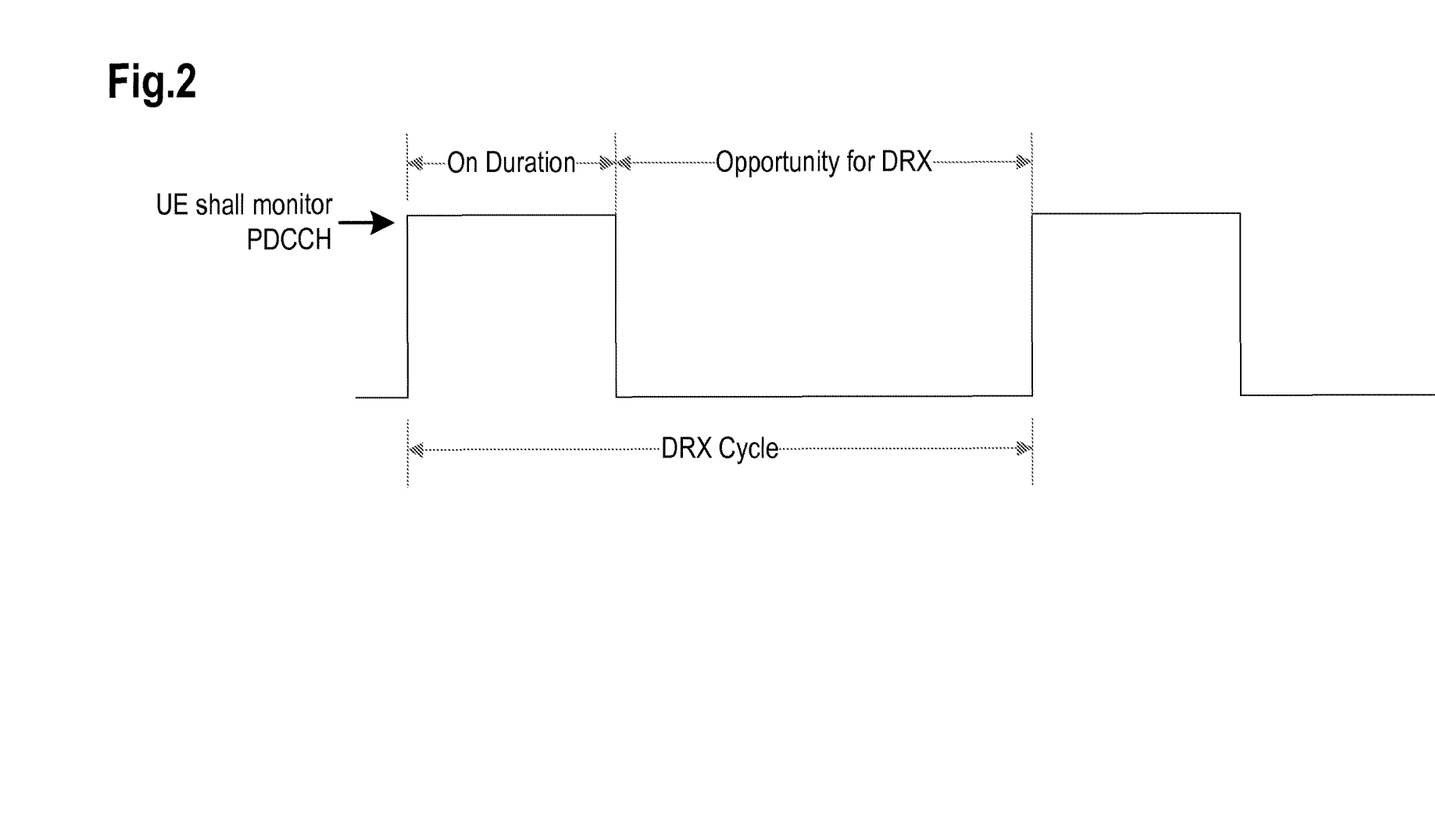
FIG. 2 shows a DRX cycle comprising an On Duration period and a time period constituting an opportunity for DRX.

FIG. 2 shows a DRX cycle comprising a time period "On Duration" and a time period "Opportunity for DRX". Basically, the time period "Opportunity for DRX" may be utilized for DRX operation and for other operations, e.g., as described herein.

The DRX functionality comprises
a Long DRX cycle,
a DRX Inactivity Timer,
a DRX Retransmission Timer,
optionally a Short DRX Cycle and
a DRX Short Cycle Timer.

Such time, cycle and timers can be defined as follows:
Active Time:
  The active time defined a time for the UE being "awake". When DRX is configured by a higher layer, such configuration comprises an "On Duration", i.e. a time the UE is continuously monitoring the PDCCH while a DRX Inactivity Timer has not yet expired and the time the UE is continuously monitoring the PDCCH while any DRX Retransmission Timer is running.
Contention Resolution Timer
  specifies the number of consecutive downlink subframe(s) during which the UE monitors the PDCCH after the uplink message containing a C-RNTI MAC control element or the uplink message associated with UE Contention Resolution Identity submitted from a higher layer is transmitted.
DRX Cycle
  specifies a periodic repetition of the On Duration followed by an optional time period of inactivity.
DRX Inactivity Timer
  specifies a number of subsequent downlink subframe(s) during which the UE monitors the PDCCH after having successfully decoded a PDCCH indicating an initial UL or DL user data transmission for this UE.
DRX Retransmission Timer
  specifies a maximum number of subsequent downlink subframe(s) the UE shall monitor the PDCCH as soon as a DL retransmission is expected by the UE.
DRX Short Cycle Timer:
  This parameter specifies a number of subsequent subframe(s) the UE shall monitor a short DRX cycle after the DRX Inactivity Timer has expired.
On Duration Timer
  specifies a number of subsequent downlink subframe(s) during which the UE monitors the PDCCH for possible allocations. The On Duration Timer is part of a DRX Cycle.

FIG. 3 shows a table comprising exemplary values for setting DRX parameters in E-UTRAN.

The approach presented herein allows for scheduling data transmission of paired D2D-capable UEs by utilizing DRX mode of UEs and related configuration-and-control signaling procedures.

This approach in particular proposes an integrated scheduling mechanism for data transmission of D2D-capable UEs, for example with both UEs being in the RRC_CONNECTED state, by exploring an OFF duration of their DRX mode configured and controlled properly.

This may be coordinated and controlled by the central NB and it may be processed by the involved components comprising the given UE (see mobile terminal UE#7 in FIG. 1). The source UE (e.g., mobile terminal UE#6 in FIG. 1) may provide mediating and relaying services between the given UE and the central NB.

The approach may consider the following aspects and/or options and it may in particular be used to become part of or to extend 3GPP LTE-A:

(1) The NB schedules data transmissions between the source UE and the given UE in an OFF duration of the DRX cycle of both UEs which are controlled and preconfigured with proper coordination between paired UEs for supporting D2D communications.

This scheduling may either be semi-static via NB-persistent allocation and configuration or it may be dynamic; thus, scheduling indication per DRX cycle can be provided either by implicit or by explicit signaling.

(a) In case of semi-static D2D scheduling or persistent allocation, the NB reconfigures the DRX parameters for both, the source UE and the given UE to couple their ON-OFF patterns of the DRX cycle when pairing a given D2D-capable UE with a suitable source UE.

To reduce a signaling overhead required for reconfiguration, the DRX configuration of potential source UEs may be one selection criterion. A source UE candidate with a similar DRX pattern compared with that of the given UE may thus be selected with high priority. Thus, the source UE and the given UE are assigned with (sufficient) resources comprising certain time interval(s) of coupled OFF duration per DRX cycle for D2D communication purposes (also power constraints and frequency resources especially in case of in-band D2D communication may be transmitted).

Figure 4A:
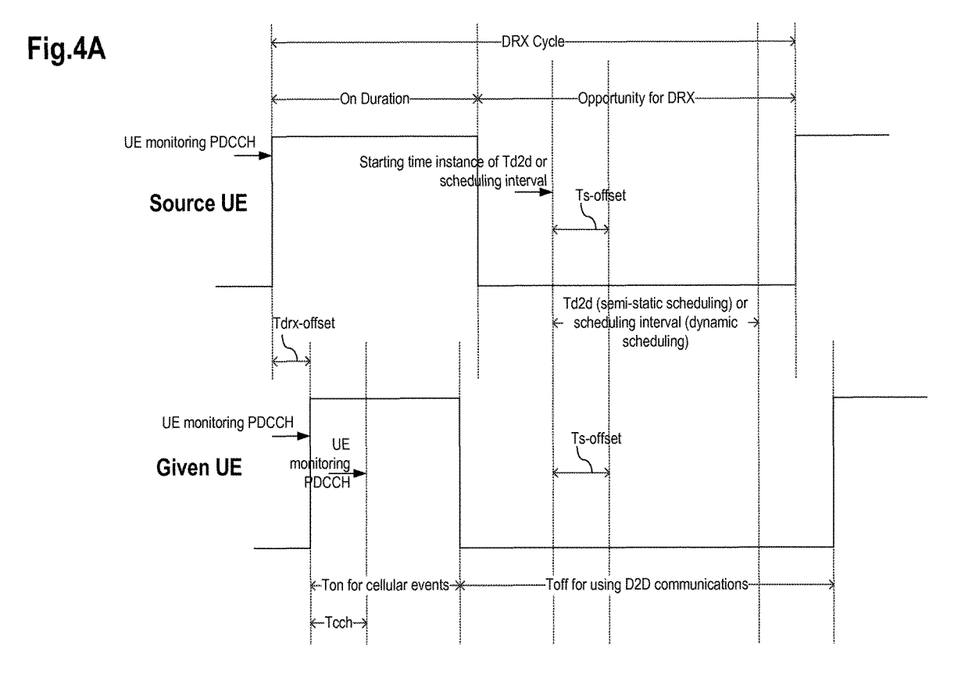
FIG. 4A visualizes an integrated DRX-D2D configuration and operation for paired D2D-capable UEs with semi-static or dynamic scheduling indicating a starting time instance of the D2D communication.

It is noted that the assignment of a D2D scheduling interval can be realized, e.g., by utilizing a Td2d parameter specifying a semi-static duration of the time interval, together with a starting time of the time interval given by predefined ordering number of a starting subframe within the DRX cycle (see FIG. 4A for illustration purposes).

To facilitate the scheduling control in the NB and data processing in both UEs and the NB, the DRX-D2D integrated reconfiguration as suggested above may comprise pre-defined formats such as size(s) for relevant L2 protocol data units (PDU) or transport blocks (TB) that the given UE may use.

Furthermore, for flow control of data transmissions between the source UE and the given UE as well as the NB, a maximum amount of data for the given UE to send to the source UE per assigned D2D interval may be provided in bytes or number(s) of L2 PDUs with a predefined size; transport blocks (TBs) may also be utilized and/or configured for that purpose.

(b) In case of a more dynamic D2D scheduling with explicit scheduling indication, the NB may force both the source UE and the given UE to enter an OFF duration of the DRX cycle in order to start D2D data transmission between them on the NB's demand.

A scheduling indication message may comprise a duration for a subsequent D2D scheduling interval if not prefixed to the rest of the OFF duration, a starting time instance of the scheduling interval (e.g., given by an ordering number of the starting subframe within DRX cycle) and an UL scheduling information to the given UE.

The UL scheduling information may comprise a maximum amount of data (either in byte or number of L2 PDUs or TBs) that the given UE can transmit to the source UE within a subsequent D2D scheduling interval (also power constraints and frequency resources can be conveyed, especially in case of in-band D2D communications).

aa) In order to a reduce signaling overhead, the L2 PDU sizes or TB sizes that the given UE may use and/or the duration of the D2D next scheduling interval (without the starting time instance) can be pre-defined and configured to affected UEs in the DRX-D2D integrated reconfiguration message when the source UE and the given UE are paired (compared to the above described semi-static case).

In this case, the source UE and the given UE can also be configured to use the regular DRX control mechanism based on monitoring a physical downlink control channel (PDCCH) and a DRX Inactivity Timer to enter an OFF duration for D2D communications without any need for the NB to provide an explicit scheduling indication.

Another alternative is to configure the given UE for fully semi-static operation as in the above semi-static D2D scheduling case comprising boundary constraints, whereas the source UE is controlled in more dynamic fashion using explicit scheduling indication constrained to semi-static configuration parameters of the given UE. This can be achieved, e.g., by using Ton and Toff parameters as shown in FIG. 4A. It may also be achieved by monitoring the PDCCH and the DRX Inactivity Timer.

bb) To ensure that the source UE and the given UE are at least able to check their D2D connection conditions (e.g., whether adequate synchronization is maintained) for each DRX cycle in case no scheduling indication is received in any given DRX cycle during a current D2D session, the NB may provide at least one D2D time interval for the source UE and for the given UE, in particular similar to the mechanism of the semi-static D2D scheduling as described above.

Figure 4B:
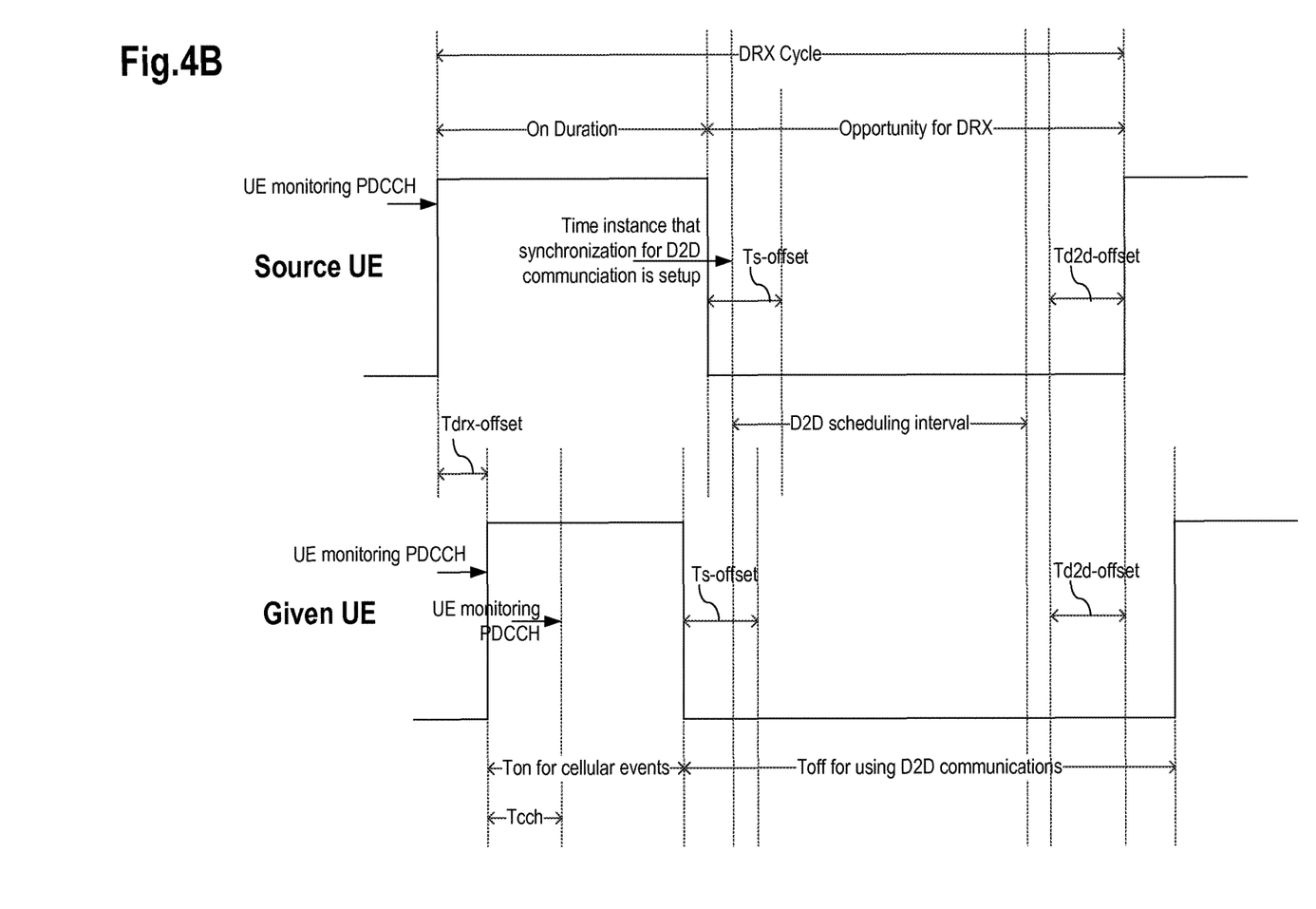
FIG. 4B visualizes an integrated DRX-D2D configuration and operation for paired D2D-capable UEs with dynamic scheduling without a starting time instance of the D2D communication.

This can be realized, e.g., by using a Td2d-offset parameter specifying the duration of the offset time interval, together with a starting time instance of the offset interval given by an ordering number of the starting subframe within the DRX cycle as illustrated in FIG. 4B.

(c) Suitable values for Ton and Toff parameters, wherein the parameter Toff equals a duration of the DRX cycle minus the duration Ton, can be determined and configured for the given UE explicitly or by using a Ton/Toff rate.

The parameter Ton may be the portion of the DRX cycle in which the given UE may be configured to monitor and communicate with the NB relevant direct cellular access events, e.g., listening to PDCCH for its allocation, sending uplink signals to the NB, etc., or just doing nothing for power saving reasons.

Thus, as a trade-off between power saving and not missing important direct cellular access events during a time period Ton, the given UE may be further configured so that it may monitor the PDCCH at least once within a predetermined time period, i.e., a time period Tcch as illustrated in FIG. 4A and FIG. 4B. Toff is the remaining portion of the DRX cycle in which D2D communication with the source UE may take place.

(d) To further improve power saving efficiency, the source UE and the given UE can be configured at a certain time offset at the beginning of a scheduled D2D time interval for checking, e.g., whether handshaking between involved UEs can be carried out and actual D2D data transmission is required.

If within this offset handshaking can be carried out, but no actual D2D data transmission is required, involved UEs may re-enter the power saving mode for the rest of the current scheduled D2D time interval.

If within this offset handshaking cannot be carried out for D2D data transmission required, the UEs involved may either (i) immediately try sending scheduling request signal to the NB to get the problem resolved as soon as possible or (ii) they may re-enter power saving mode for the rest of the current scheduled D2D time interval and then try to get the problem resolved provided that the current scheduled D2D time interval (or even configured DRX cycle) is short enough.

This time offset can be realized, e.g., by using a Ts-offset parameter specifying a duration of the offset time interval, as illustrated in FIG. 4A and FIG. 4B.

The synchronization and handshaking protocol for starting data transmission between the source UE and the given UE depends on the RAT used for D2D communications.

(e) Either L2 (e.g., MAC) or L3 (e.g. RRC) signaling can be used for scheduling indication purposes in a dynamic option or as a reconfiguration message realized by either dynamic or semi-static options. However, providing a fast operation for scheduling indication as well as a reliable reconfiguration message, L2 signaling may be used for scheduling indication purposes and L3 signaling may be used for reconfiguration message purposes.

It is noted that in 3GPP LTE E-UTRAN, RRC signaling is used to configure DRX parameters and operation for the UE. A L2 MAC DRX command can be used to force the UE to enter said OFF duration in a DRX cycle. These RRC signaling and MAC DRX Command can be extended and used to incorporate and integrate D2D parameters and configurations as set forth herein.

(f) The contents of the aforementioned configuration and scheduling messages and proper values of the configuration parameters thereof may be determined considering in particular at least one of the following:
user traffic characteristics of at least one UE;
a mobile battery power status of at least one UE;
a channel condition of at least one UE;
frame structure(s) and frame duration(s) of RAT(s) used for D2D communications between involved UEs;
in-band D2D or out-of-band D2D with regard to the cellular band;
a number of hops on D2D communications path.

It is noted that scheduling in-band D2D communication may require assignment of other resources than time interval(s), maximum amount of data, and sizes of relevant L2 PDUs or TBs. For examples, semi-static or dynamic assignment of transmit power constraints and frequency resources may be utilized as well, in particular depending upon advanced CR capabilities of UEs involved.

(2) The NB schedules the actual data transmission between the source UE and the NB during ON duration of DRX cycle of source UE. Both of data to and/or from the source UE and data delivered and/or forwarded to the given UE are transmitted to and/or from the NB during the ON duration of the DRX cycle of the source UE.

(3) The NB provides scheduling indication to both the source UE and the given UE during coupled ON duration of the DRX cycle for explicit scheduling purposes.

FIG. 4A and FIG. 4B illustrate an example of possible implementations, considering and/or based on LTE E-UTRAN. An initial DRX-D2D integrated configuration comprises the NB pairing the source UE with the given UE (i.e., handing over the given UE to the source UE for making use of D2D communications), synchronizing DRX cycles of the source UE and the given UEs with a timing offset Tdrx-offset as shown in FIG. 4A and FIG. 4B. Values for said Tdrx-offset may be 0, 1 or multiple subframe(s) of the cellular system. The explicit configuration of the Tdrx-offset can be omitted if Tdrx is set to 0.

LIST OF ABBREVIATIONS

CR Cognitive Radio
D2D Device to Device
DL Downlink
DRX Discontinuous Reception and Transmission
FSU Flexible Spectrum Use
IE Information Element
ISM Industrial, Scientific and Medical
L2 Layer-2
L3 Layer-3
MAC Medium Access Control
PDCCH Physical Downlink Control Channel
PDU Protocol Data Unit
RAT Radio Access Technology
RRC Radio Resource Control
TB Transport Block
UE User Equipment
UL Uplink

The invention claimed is:
1. A method comprising:
receiving, at a mobile terminal operating in an evolved universal terrestrial radio access network, scheduling information for a Discontinuous Reception and Transmission cycle;
executing the Discontinuous Reception and Transmission cycle;
at the mobile terminal, monitoring a control channel of the network for allocation of resources to the mobile terminal on a data channel; and
at the mobile terminal, utilizing a portion of the Discontinuous Reception and Transmission cycle for communicating with a second mobile terminal in a device-to-device communication mode, based on the received scheduling information, during a period in which the mobile terminal is operating in an RRC_CONNECTED state in the network, wherein the received scheduling information specifies scheduling of data transmissions between the mobile terminal and the second mobile terminal during an off transmission of the discontinuous Reception and Transmission cycle of the mobile terminal and the second mobile terminal, and wherein the scheduling information further specifies at least two of:
a duration for a subsequent device-to-device scheduling interval;
a starting time for the scheduling interval;
an uplink scheduling information to the mobile terminal and the second mobile terminal.

2. The method according to claim 1, wherein the mobile terminal and the second mobile terminal are paired device-to-device-capable mobile terminals.

3. The method according to claim 1, wherein one or more of configuration and signalling procedures are provided between the mobile terminal and the second mobile terminal, and a base station.

4. The method according to claim 1, wherein a base station schedules the data transmissions between the mobile terminal and the second mobile terminal during an OFF duration of the Discontinuous Reception and Transmission cycle of the mobile terminal and the second mobile terminal.

5. The method according to claim 4, wherein the data transmissions between the mobile terminal and the second mobile terminal are either semi-statically scheduled via persistent allocation and configuration information provided by the base station, or dynamically scheduled.

6. The method according to claim 5, wherein in case of semi-static scheduling, the base station reconfigures parameters of the Discontinuous Reception and Transmission cycle for the mobile terminal and for the second mobile terminal for coupling of their ON-OFF patterns of the Discontinuous Reception and Transmission cycle.

7. The method according to claim 6, wherein the mobile terminal and the second mobile terminal are assigned resources for at least one time interval of coupled OFF duration per Discontinuous Reception and Transmission cycle for device-to-device communication purposes.

8. The method according to claim 4, wherein the base station informs the mobile terminal and the second mobile terminal to enter OFF duration of the Discontinuous Reception and Transmission cycle in order to start device-to-device data transmission.

9. The method according to claim 4, wherein the base station conveys one or more of a duration for a subsequent device-to-device scheduling interval, a starting time for the scheduling interval, and/or an uplink scheduling information to the mobile terminal and the second mobile terminal.

10. The method according to claim 4, wherein the mobile terminal and the second mobile terminal are configured to provide a predetermined time offset at the beginning of a scheduled device-to-device time interval.

11. The method according to claim 4, wherein the mobile terminal and the second mobile terminal enter a power-saving mode if no actual device-to-device data transmission is needed.

12. The method according to claim 4, wherein the base station schedules data transmission between the mobile terminal and the base station during an ON duration of the Discontinuous Reception and Transmission cycle of the mobile terminal.

13. A computer program product comprising at least one non-transitory computer-readable storage medium having computer-executable program code instructions stored therein, wherein execution of the computer-executable program code instructions by a processor configures a mobile terminal to at least:

receive scheduling information for a Discontinuous Reception and Transmission cycle in an evolved universal terrestrial radio access network;
execute the Discontinuous Reception and Transmission cycle;
monitor a control channel of the network for allocation of resources to the mobile terminal on a data channel; and
utilize a portion of the Discontinuous Reception and Transmission cycle for communicating with a second mobile terminal in a device-to-device communication mode, based on the received scheduling information, during a period in which the mobile terminal is operating in an RRC_CONNECTED state in the network, wherein the received scheduling information specifies scheduling of data transmissions between the mobile terminal and the second mobile terminal during an off transmission of the discontinuous Reception and Transmission cycle of the mobile terminal and the second mobile terminal, and wherein the scheduling information further specifies at least two of:
a duration for a subsequent device-to-device scheduling interval;
a starting time for the scheduling interval;
an uplink scheduling information to the mobile terminal and the second mobile terminal.

14. A mobile terminal comprising:
at least one processor;
memory storing a program of instructions;
wherein the memory storing the program of instructions is configured to, with the at least one processor, cause the mobile terminal to at least:
receive scheduling information of a Discontinuous Reception and Transmission cycle in an evolved universal terrestrial radio access network;
execute the Discontinuous Reception and Transmission cycle;
monitor a control channel of the network for allocation of resources to the mobile terminal on a data channel; and
utilize a portion of the Discontinuous Reception and Transmission cycle for communicating with a second mobile terminal in a device-to-device communication mode, based on the received scheduling information, during a period in which the mobile terminal is operating in an RRC_CONNECTED state in the network, wherein the received scheduling information specifies scheduling of data transmissions between the mobile terminal and the second mobile terminal during an off transmission of the discontinuous Reception and Transmission cycle of the mobile terminal and the second mobile terminal, and wherein the scheduling information further specifies at least two of:
a duration for a subsequent device-to-device scheduling interval;
a starting time for the scheduling interval;
an uplink scheduling information to the mobile terminal and the second mobile terminal.

15. A method comprising:
transmitting, in an evolved universal terrestrial radio access network, scheduling information for a Discontinuous Reception and Transmission cycle to a mobile terminal;
wherein the mobile terminal is configured to at least:
execute the Discontinuous Reception and Transmission cycle;
monitor a control channel of the network for allocation of resources to the mobile terminal on a data channel; and utilize a portion of the Discontinuous Reception and Transmission cycle for communicating with a second mobile terminal in a device-to-device communication mode, based on the received scheduling operation, during a period in which the mobile terminal is operating in an RRC_CONNECTED state in the network, wherein the received scheduling information specifies scheduling of data transmissions between the mobile terminal and the second mobile terminal during an off transmission of the discontinuous Reception and Transmission cycle of the mobile terminal and the second mobile terminal, and wherein the scheduling information further specifies at least two of:

a duration for a subsequent device-to-device scheduling interval;

a starting time for the scheduling interval;

an uplink scheduling information to the mobile terminal and the second mobile terminal.

16. An apparatus comprising:

at least one processor;

memory storing a program of instructions;

wherein the memory storing the program of instructions is configured to, with the at least one processor, cause the apparatus to at least:

transmit scheduling information of a Discontinuous Reception and Transmission cycle to a mobile terminal in an evolved universal terrestrial radio access network;

wherein scheduling information is configured for use by the mobile terminal to at least:

execute the Discontinuous Reception and Transmission cycle, being configured to monitor a control channel of the network for resource allocations on a data channel to the mobile terminal; and utilize a part of the Discontinuous Reception and Transmission cycle for communicating with a second mobile terminal in a device-to-device communication mode, based on the received scheduling information, during a period in which the mobile terminal is operating in an RRC_CONNECTED state in the network, wherein the received scheduling information specifies scheduling of data transmissions between the mobile terminal and the second mobile terminal during an off transmission of the discontinuous Reception and Transmission cycle of the mobile terminal and the second mobile terminal, and wherein the scheduling information further specifies at least two of:

a duration for a subsequent device-to-device scheduling interval;

a starting time for the scheduling interval;

an uplink scheduling information to the mobile terminal and the second mobile terminal.

* * * * *